Sept. 3, 1957     E. A. FRIEDMAN     2,805,349
MODEL AIRPLANE CONTROL DEVICE
Filed Oct. 19, 1955
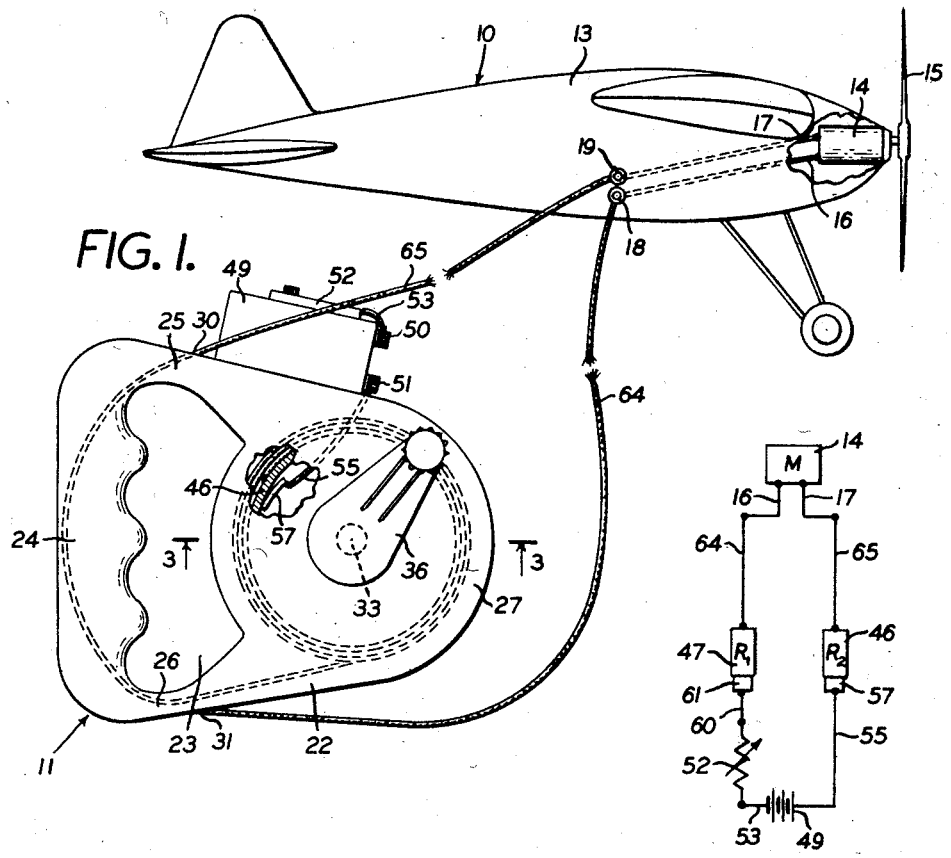
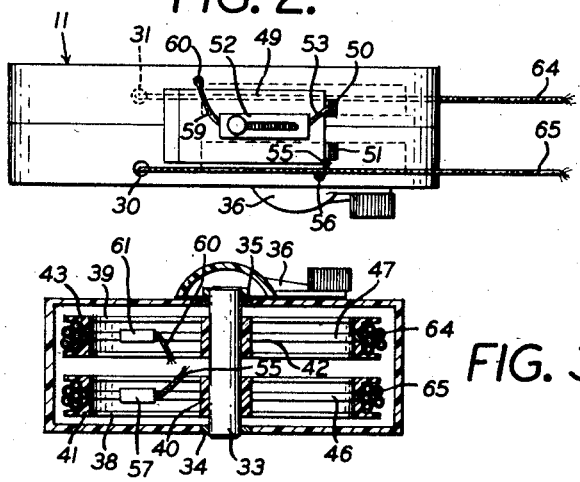
INVENTOR
ELLIOTT A. FRIEDMAN.
BY
ATTORNEYS.

United States Patent Office 2,805,349
Patented Sept. 3, 1957

2,805,349
MODEL AIRPLANE CONTROL DEVICE
Elliott A. Friedman, New York, N. Y.

Application October 19, 1955, Serial No. 541,505

2 Claims. (Cl. 307—156)

This invention relates generally to control devices for use in conjunction with tethered attachments, such as model aircraft and the like. In particular, this invention is directed to improved means for controlling electrically operated tethered attachments.

Heretofore, as is well known to those versed in the art, model aircraft were usually propelled by gasoline, battery or clockwork mechanisms; and, reel and wire devices were employed to guide or control the models. However, when it has been attempted to power model planes by electric motors powered from a source exteriorly of the plane, considerable difficulty has been experienced. For example, the necessity for electric wires extending from the supply source to the model has greatly limited the degree of control capable of being exercised by the operator. Further, it has in the past been considered impossible to vary the distance from the operator at which such model planes fly.

Accordingly, it is a general object of the present invention to provide a control device for tethered attachments which overcomes the above mentioned difficulties, and is capable of powering from the ground an electric motor located in the attachment, while affording the operator a considerably greater degree of control than was heretofore possible.

It is a more particular object of the present invention to provide a control device having the advantageous characteristics mentioned in the foregoing paragraph, which includes a rotatable reel having a conductive annulus rotatable therewith, an electrical conductor wound about the reel having one end connected to the annulus and having its other end adapted for electrical and mechanical connection to an attachment, and an electrically conductive brush in electrical contact with the annulus for transmitting power to the latter, and thence through the conductor to the attachment.

It is a further object of the present invention to provide a control device of the type described which is extremely simple in construction and operation, durable in use, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is an elevational view showing an electrically operated model airplane and the control device of the invention in operative association with the airplane, parts being broken away for clarity of understanding and conservation of space;

Fig. 2 is a top plan view showing the control device of Fig. 1;

Fig. 3 is a sectional view taken substantially along the line 3—3 of Fig. 1; and Fig. 4 is a schematic, electrical diagram showing the circuit of the instant device.

Referring now more particularly to the drawings, and specifically to Fig. 1 thereof, the embodiment illustrated therein comprises a model aircraft, generally designated 10, and the control device of the instant invention, generally designated 11.

The aircraft includes a fuselage 13 having an electric motor 14 mounted in the forward end or nose of the fuselage. A propeller 15, exteriorly of the fuselage 13, is connected to the motor 14 to be driven thereby. Conductors or wires 16 and 17 are disposed interiorly of the fuselage 13 and connected between the motor 14 and a pair of fixed terminals 18 and 19. That is, the terminals 18 and 19 are fixed to the fuselage 13, preferably in spaced relation on the fuselage, and are electrically connected to the motor 14 by the wires 16 and 17, respectively.

The control device 11 includes a hollow housing or casing 22, shaped with a through finger receiving opening 23, to define a hollow hand grip portion 24. Viewed otherwise, the housing or casing 22 is substantially entirely hollow, and includes a hand grip section 24, and arms 25 and 26 extending from opposite ends of the hand grip and rigidly connecting a generally cylindrical housing section 27 to the hand grip. In one of the housing arms 25, adjacent to and spaced inwards from one side of the housing, is formed an outwardly opening aperture 30 which communicates between the interior and exterior of the housing. A similar outwardly opening aperture 31 is formed in the other housing arm 26 adjacent to and spaced from the other side of housing, so that the apertures 30 and 31 are laterally offset from each other as seen in Fig. 2.

Extending generally centrally or axially through the cylindrical housing portion 27, and rotatably journaled in opposite side walls thereof, is a shaft or pin 33. That is, the shaft 33 is rotatably supported in bushings 34 and 35 fixed in opposite side walls of the cylindrical casing section 27. A manually actuable handle or crank 36 is arranged exteriorly of the cylindrical housing section 27 and fixed to one end of the shaft 33 for effecting manual rotation of the latter.

Spacedly and conformably received within the cylindrical housing section 27 are a pair of reels or spools 38 and 39, both of which may be fixedly circumposed about the shaft 33 for rotation therewith upon actuation of the handle 36. More specifically, the reel 38 includes a hub 40 fixedly circumposed about the shaft 33, and an outer drum 41 concentric with and secured to the hub as by a spider, or other suitable means (not shown). Similarly, the reel 39 includes an inner hub 42 fixedly circumposed about the shaft 33, and an outer drum 43 spacedly and concentrically surrounding the hub and fixedly secured to the latter by spokes or other appropriate structure. It will be noted that the housing 22, handle 36, hubs 40 and 42, and drums 41 and 43, are all preferably fabricated of plastic or other suitable insulating material.

However, embedded in each drum 41 and 43, extending circumferentially thereabout and being exposed interiorly thereof, is an annulus or slip ring, as at 46 and 47, respectively, which is fabricated of metal or other suitably conductive material.

Mounted exteriorly of the casing 22, preferably on the top of the latter, as shown in the drawings, is an electric battery 49 having terminal posts 50 and 51. A variable resistance or rheostat 52 is preferably mounted on the battery 49 and electrically connected to the latter, as by a conductor 53 connected to the post 50.

Connected at one end to the battery post 51 is a conductor 55 which extends into the interior of the casing portion 27 through an aperture 56. The other end of the conductor 55, disposed interiorly of the casing section 27, is electrically connected to a brush 57, which is in contact with the exposed internal surface of the annulus 46. More specifically, the brush 57 is fabricated of electrically conductive material, in a manner similar to a commutator brush, and fixedly positioned, by any suitable means, in electrical contact with the rotatable annulus 46.

A conductor or wire 59 is connected at one end to the rheostat 52, the latter being in series with the conductor 59 and battery post 50; and, the conductor 59 extends from the rheostat through a housing opening 60 into the interior of the housing section 27. On the inner end of the conductor 59, interiorly of the housing section 27, is electrically connected a brush 61 of the same general construction as the brush 57. Also, the brush 61 is fixedly positioned, by any suitable means, so as to be in contact with the internal, exposed surface of the annulus 47 upon rotation of the latter with the drum 43.

Wound about the drum 43 of the reel 39 is an elongate, flexible conductor or wire 64, which has one end electrically and mechanically connected to the fuselage terminal 18, and has its other end electrically connected to the annulus or ring 47. Further, the wire 64 extends from the reel outwards through the housing opening 31 at the bottom of the housing, as seen in Fig. 1. A second flexible, elongate electrical conductor or wire 65 has one end electrically connected to the annulus or ring 46, and is wound about the drum 41 of reel 38. From reel 48, the conductor 64 extends out of the housing 22 through the top housing opening 30 and has its outer end electrically and mechanically connected to the fuselage terminal 19.

The electrical circuit is thus completed, as best seen in Fig. 4, through the battery 49, conductor or line 53, rheostat 52, wire brush 61, slip ring 47, wire 64, wire 16, motor 14, wire 17, line 65, slip ring 46, brush 57 and wire 55. This, of course, permits the transmission of power from the location of the operator to the motor 14 for propelling the model 10. In addition to transmission of power, the reels 38 and 39 may be rotated to let out more or less of the wires 64 and 65, as desired, to control the distance of the model from the operator; and, the spacing of the housing openings 30 and 36, will enable the model 10 to be further controlled by manipulation of the casing 22 in the operator's hand.

From the foregoing, it is seen that the present invention provides a control device for tethered attachments which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

For example, it is appreciated that the circuit of Fig. 4 need not employ the rheostat 52; and further, that the particular circuit may be otherwise altered or modified without departing from the essence of the instant invention.

It is understood that the reels 38 and 39 may be provided with individual actuating handles, or other suitable means, for effecting independent rotation of the reels, if desired. Further, an additional supply source, say a 6 volt battery may be arranged at any convenient location externally of the device to provide greater power and larger operation. Suitable braking means may also be incorporated in the device for resisting or limiting rotation of the reels.

What is claimed is:

1. A manually manipulated control mechanism for an electrically operated device having an electrical and mechanical tethered attachment, said mechanism comprising a portable housing fabricated of an insulating material, spaced openings in said housing defining communications between the exterior and interior thereof, a spindle bearingly mounted for rotation in said housing, a manually operable crank secured to said spindle to manually rotate the same, a pair of reels mounted on said spindle within said housing for rotation therewith relative to said housing, said reels each being fabricated of an insulating material, an electrically conductive annulus affixed to and rotatable with each of said reels, a flexible electrical conductor wound about each of said reels and each having one end electrically connected to an annulus of their respective reel, the other end of each of said conductors extending through said openings for mechanical and electrical connection to said device and its tethered attachment to electrically operate said device and mechanically move the same to and away from said portable housing in response to manual actuation of said crank handle, a pair of electrically conductive brushes each affixed in said housing in electrical contact with a respective one of said rotatable annuli, an electrical source of supply, said brushes being connected to opposite poles of said source of supply for transmitting power through the circuit defined by said annuli, conductors and attachment, and a hand grip finger receiving opening in said housing to enable manipulation of said housing and said conductors to manipulate said tethered attachment and said device to perform desired movements.

2. The combination, as in claim 1, of said electrical source of supply being mounted on said housing for manipulation therewith, and a rheostat interposed between one of said brushes and said source of supply to vary the electrical current transmitted to said device.

References Cited in the file of this patent

UNITED STATES PATENTS 1,360,686    Robinson _____ Nov. 30, 1920